United States Patent
Trisnadi et al.

(10) Patent No.: US 12,141,573 B2
(45) Date of Patent: Nov. 12, 2024

(54) METHODS AND TERMINAL FOR UPDATING CONVERTED APPLET FILE, AND JAVA CARD DEVICE

(71) Applicant: IDEMIA FRANCE, Courbevoie (FR)

(72) Inventors: Iwan Trisnadi, Courbevoie (FR); Yosef Didik Kurniawan, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 79 days.

(21) Appl. No.: 17/900,969

(22) Filed: Sep. 1, 2022

(65) Prior Publication Data
US 2023/0084048 A1 Mar. 16, 2023

(30) Foreign Application Priority Data
Sep. 2, 2021 (EP) .................... 21306203

(51) Int. Cl.
*G06F 9/445* (2018.01)
*G06F 8/65* (2018.01)
*G06F 9/455* (2018.01)

(52) U.S. Cl.
CPC ............ *G06F 8/65* (2013.01); *G06F 9/44521* (2013.01); *G06F 9/45504* (2013.01)

(58) Field of Classification Search
CPC ..... G06F 8/65; G06F 9/44521; G06F 9/45504
See application file for complete search history.

(56) References Cited

U.S. PATENT DOCUMENTS

| 5,579,223 A | 11/1996 | Raman | |
|---|---|---|---|
| 2002/0061096 A1* | 5/2002 | Lautenschlager | ........ H04Q 3/72 379/88.19 |
| 2003/0042318 A1* | 3/2003 | Krishna | ............... G06Q 20/341 235/492 |
| 2003/0093781 A1* | 5/2003 | Krishna | .............. G06F 9/44521 717/162 |

(Continued)

FOREIGN PATENT DOCUMENTS

| EP | 2887213 A1 | 6/2015 |
|---|---|---|
| EP | 3160167 A1 | 4/2017 |

OTHER PUBLICATIONS

Krainer Franz : "Design and Implementation of a Java Card Patching Mechanism for Smart Card Operating Systems" XP055889393, Jan. 1, 2010, URL:https://diglib.tugraz.at/download.php?id=576a772b272c0&location=browse.

(Continued)

*Primary Examiner* — Chuck O Kendall
(74) *Attorney, Agent, or Firm* — WOMBLE BOND DICKINSON (US) LLP

(57) ABSTRACT

A method implemented by a Java Card device for updating a CAP file including at least one existing component on the Java Card device. The method includes: receiving from a terminal one or multiple first commands including an update file for updating the CAP file; determining at least one element type or location of at least one existing first element of the CAP file using type information or first location information included in the update file; searching the CAP (Continued)

S11: receiving from a terminal one or more first commands including an update file for updating the CAP file S12: determining at least one element type or location of at least one existing first element of the CAP file using type information or first location information included in the update file S13: searching the CAP file on the Java Card device for the at least one existing first element using the at least one determined element type or location S14: if the at least one existing first element is found, replacing each of the at least one existing first element by one of at least one new first element comprised in the update file file on the Java Card device for the at least one existing first element using the at least one determined element type or location; and if the at least one existing first element is found, replacing each of the at least one existing first element by one of at least one new first element included in the update file.

20 Claims, 6 Drawing Sheets

(56) References Cited

U.S. PATENT DOCUMENTS

2015/0193224 A1   7/2015   Ziat et al.

OTHER PUBLICATIONS

GlobalPlatform Technology, Card Specification, Version 2.3.1, document reference: GPC_SPE_034, Mar. 2018.
GlobalPlatform Technology, Executable Load File Upgrade, Card Specification, v2.3—Amendment H Version 1.1, document reference: GPC_SPE_120, Mar. 2018.
Java Card Platform—Runtime Environment Specification, Classic Edition, Version 3.1, Feb. 2021.
Java Card Platform—Virtual Machine Specification, Classic Edition Version 3.1, Feb. 2021.
Virtual Machine Specification, Sun Microsystems, Java Card Platform, Version 2.2.2, Mar. 2006.

* cited by examiner

```
                                                          ┌─ S31
┌─────────────────────────────────────────────────────────────┐
│ determining the length of one of the at least one new first element │
│ according to length information included in the update file │
└─────────────────────────────────────────────────────────────┘
                              │
                              ▼                           ┌─ S32
┌─────────────────────────────────────────────────────────────┐
│ allocating memory of the Java Card device to the new first element │
│ according to the determined length                          │
└─────────────────────────────────────────────────────────────┘
```

FIG. 3

```
                                                          ┌─ S41
┌─────────────────────────────────────────────────────────────┐
│ defragmenting memory of the Java Card device                │
└─────────────────────────────────────────────────────────────┘
```

FIG. 4

```
                                                          ┌─ S51
┌─────────────────────────────────────────────────────────────┐
│ upgrading at least one existing second item according to a location │
│ in the CAP file allocated to the new first element          │
└─────────────────────────────────────────────────────────────┘
```

FIG. 5

```
                                                          ┌─ S61
┌─────────────────────────────────────────────────────────────┐
│ determining at least one location of the at least one existing second │
│ item in the at least one existing component using second location │
│ information included in the update file                     │
└─────────────────────────────────────────────────────────────┘
```

FIG. 6

```
                                                          ┌─ S71
┌─────────────────────────────────────────────────────────────┐
│ For each existing first element, before replacing it at the replacing │
│ step S14, backing up the existing first element             │
└─────────────────────────────────────────────────────────────┘
                              │
                              ▼                           ┌─ S72
┌─────────────────────────────────────────────────────────────┐
│ If an error occurs during the replacing step S14, rolling the at least │
│ one existing component back to a version prior to the error using at │
│ least one copy of the at least one existing first element   │
└─────────────────────────────────────────────────────────────┘
```

FIG. 7

S81 transmitting to the Java Card device one or more first commands including an update file for updating the CAP file

FIG. 8

S91 transmitting to the Java Card device a second command including an identifier to inform the Java Card device that a CAP file on the Java Card device is to be updated

S92 receiving from the Java Card device a response indicating that the Java Card device is ready to process a command subsequent to the second command if a package or CAP file associated with the identifier is found on the Java Card device

FIG. 9

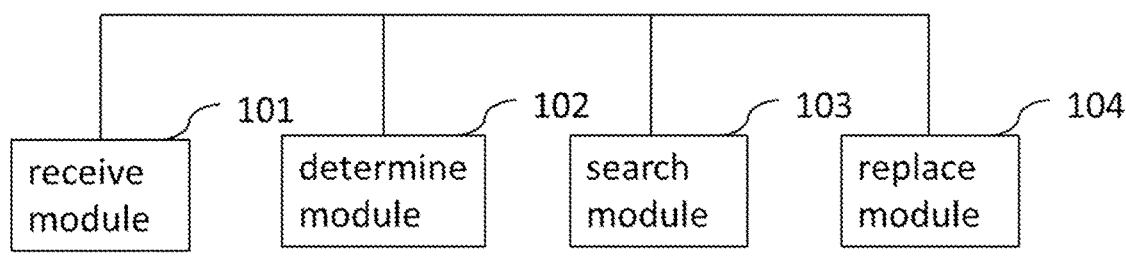

FIG. 10

METHODS AND TERMINAL FOR UPDATING CONVERTED APPLET FILE, AND JAVA CARD DEVICE

CROSS-REFERENCE TO RELATED APPLICATIONS

This application claims the benefit of European Patent Application No. 21306203.7, filed Sep. 2, 2021, which is incorporated by reference herein in its entirety.

TECHNICAL FIELD

The present disclosure relates generally to the field of Java Card technology, and, in particular, to methods and terminal for updating a converted applet (hereinafter "CAP") file and a Java Card device.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Java Card technology enables programs written in the Java programming language to be run on smart cards and similar trusted devices with limited memory and processing capabilities, such as smart buttons, universal serial bus (hereinafter "USB") tokens, and the like. Application software written for the Java Card platform is called Java Card technology-based applets (Java Card applets or card applets).

All card applet classes extend from the base class javacard.framework.Applet. A workstation uses a Java Card converter to convert one or more card applet classes and the other classes in their packages to a CAP file, which is then downloaded by Java Card technology-enabled devices or Java Card devices through application protocol data unit (hereinafter "APDU") commands detailed in the GlobalPlatform Technology, Card Specification (for example, Version 2.3.1, document reference: GPC_SPE_034). The Java Card CAP file mentioned herein is as defined in the Virtual Machine Specification for Java Card™ Platform (hereinafter "JCVMS"), where according to Version 3.1, Classic Edition (hereinafter "v3.1") of the JCVMS, a CAP file can be in Compact or Extended format, a CAP file in Compact format can only contain a single Java package and a CAP file in Extended format may contain one or more Java packages, whereas according to versions prior to v3.1 (for example v2.2.2) of the JCVMS, a CAP file has only one format and can only contain a single package.

After the CAP file has been loaded onto the Java Card devices, objects (or called "instances") of the card applet class are created and personalized by service providers (e.g., different banks) with both user data and secret or sensitive data.

As defined in the JCVMS (e.g., v3.1 or v 2.2.2), a CAP file includes a set of components. Each component describes an aspect of the CAP file. In some implementations of Java Card platform, the Debug Component is not downloaded to the Java Card device, or, one or more components of a CAP file no longer exist on the Java Card device after information therein has been extracted for installing the CAP file on the Java Card device. Thus a CAP file including one or more components on a Java Card device is herein referred to as a CAP file on the Java Card device.

According to the JCVMS (e.g., § 6.2 of v3.1 or § 6.1 of v2.2.2), all components have the following general format:
component (or component_compact or component_extended) {
    u1 tag
    u2 (or u4) size
    u1 info[ ]
}

In existing technologies, due to the limitations of current deletion and installation commands, to update or upgrade a CAP file (e.g., to fix a bug or add a new feature) on a Java Card device, the Java Card device has to first delete all card-resident components and instances of the CAP file and all the instance data according to DELETE command(s) received from a terminal, and then receives subsequent commands to load the upgraded CAP file and install the upgraded CAP file.

The above-mentioned upgrade process may cause problems. In particular, it is time-consuming for the Java Card device to download a large-size upgraded CAP file when the bandwidth for the download is limited (e.g., when the download is done over the air via an over-the-air server). Moreover, if a card applet class of the CAP file has been instantiated before the deletion of the CAP file, its instances and related instance data have to be removed before loading the upgraded CAP file, and thus the personalization process, which can sometimes be complex and expensive, must be repeated after installation of the upgraded CAP file.

SUMMARY

Except for the term "one or more" and unless otherwise stated, the term "or" hereinafter is to be understood as "and/or". In addition, the term "multiple" is to be understood as "more than one" herein.

The disclosure applies to any compatible CAP file format as specified in different versions of the JCVMS, including v3.1 and v2.2.2. Unless otherwise specified, any component or item of component mentioned hereinafter refers to a component or item of component in any such compatible CAP file format, respectively.

As will be appreciated by one skilled in the art, aspects of the present principles can be embodied as a system, method, computer program or computer readable medium. Accordingly, aspects of the present principles can take the form of an entirely hardware embodiment, an entirely software embodiment (including firmware, resident software, microcode, and so forth), or an embodiment combining software and hardware aspects that can all generally be referred to herein as a "circuit," "module", or "system."

In a first aspect, an embodiment of the present disclosure provides a method implemented by a Java Card device for updating a CAP file including at least one existing component on the Java Card device. The method includes steps of: receiving from a terminal one or multiple first commands including an update file for updating the CAP file; determining at least one element type or location of at least one existing first element of the CAP file using type information or first location information included in the update file; searching the CAP file on the Java Card device for the at least one existing first element using the at least one determined element type or location; and if the at least one existing first element is found, replacing each of the at least one existing first element by one of at least one new first element included in the update file. The first command received from the terminal includes the CAP file, or the multiple first commands each include a portion of the update file. Each of the at least one element type represents one or more of: at least one component and at least one item of at least one component. The element type of each of the at least one new first element and the element type of the existing first element replaced by the new first element are the same. The one or multiple first commands are of an instruction type of instructing the Java Card device to implement the replacing step.

By receiving one or multiple first commands and then replacing at least one card-resident element which needs to be upgraded with at least one new element included in the one or multiple first commands, instead of deleting the entire CAP file according to DELETE command(s) and then loading the upgraded CAP file according to subsequent command(s), the method according to the embodiment in the first aspect may update the CAP file on the Java Card device with fewer components or items being transferred to the Java Card device. In addition, no instance data of the CAP file needs to be removed. Accordingly, the upgrade process becomes faster comparing with the existing technology and it saves the service providers repeating the personalization process.

According to another embodiment in the first aspect, before receiving the one or multiple first commands, the method further includes: receiving from the terminal a second command informing the Java Card device that the CAP file on the Java Card device is to be updated; checking whether a package or CAP file associated with an identifier included in the second command is present on the Java Card device, where the CAP file to be updated is the CAP file associated with the identifier, or the CAP file to be updated includes the package associated with the identifier; and if the package or CAP file associated with the identifier is found on the Java Card device, then returning to the terminal a response indicating that the Java Card device is ready to process a command subsequent to the second command.

As such, the Java Card device may recognize the CAP file to be updated amid multiple CAP files on it easily and may receive and process subsequent command(s) for updating the CAP file only when the CAP file is found on it.

According to still another embodiment in the first aspect, the replacing step is implemented after the complete update file is received by the Java Card device. As such, the Java Card device is able to avoid corrupting data in case of not receiving any portion of the update file which should have been received.

According to still another embodiment in the first aspect, the type information indicates at least one element type of the at least one new first element, or the type information indicates at least one element type of at least one existing second element each including one of the at least one existing first element.

In particular examples of the embodiment, the type information includes the location of one of the at least one new first element in the update file, or the type information includes one or more tags each associated with the element type of one of the at least one new first element or associated with the element type of an existing second element including an existing first element to be replaced by the new first element.

The embodiment provides examples of the type information enabling the Java Card device to determine at least one element type or location of the at least one existing first element. Such type information may limit the size of the update file or simplify the Java Card device's determination of the at least one element type or location.

In another example of the embodiment, the one or more tags and the new first element are grouped together in the update file. As such, the Java Card device may efficiently determine the location or element type of the new first element according to the one or more tags.

According to still another embodiment in the first aspect, the first location information indicates at least one location of the at least one existing first element in the CAP file. Or the first location information indicates at least one location of at least one existing second element in the CAP file, where the at least one existing second element each includes one of the at least one existing first element.

In particular examples of the embodiment, the first location information includes an offset or index of: one of the at least one existing first element in one of the at least one existing second element, or, the existing second element in an existing third element.

The embodiment provides examples of the first location information enabling the Java Card device to determine at least one element type or location of the at least one existing first element. Such location information may reduce the size of the update file or simplify the Java Card device's determination of the at least one element type or location.

In particular, the update file includes one or more tags associating the offset or index with the new first element to replace the existing first element. As such, the Java Card device may efficiently link the new first element to the existing first element.

According to still another embodiment in the first aspect, the at least one new first element includes at least one new bytecodes item to be added into the CAP file through the replacing step, or the at least one existing first element includes at least one existing bytecodes item to be removed from the CAP file through the replacing step. In an example, through the replacing step at least one existing first item affected by the adding or removing is upgraded. The at least one affected existing first item is included in the at least one existing component and includes: an existing handler_count or count item, or, an existing size item in an existing Method Component, Class Component or Constant Pool Component, or, an existing exception_handlers, public_virtual_method_table, package_virtual_method_table, constant_pool, or method_component_block_offsets item.

The bytecodes item, as part of a method_info item of the Method Component, represents an array of Java Card bytecodes that implement a method. According to the embodiment, the update process of the CAP file includes adding at least one new bytecodes item into the CAP file or removing at least one existing bytecodes item from it through the replacing step, where if there's at least one existing first item that is affected by the adding or removing, the update process further includes upgrading the at least one existing first item at the replacing step, thus avoiding a mismatch between any object created from a class of the CAP file before the replacing step and the class after the replacing step, avoiding affecting any instance data of the object, and making the update process simple for the Java Card device.

According to still another embodiment in the first aspect, the method further includes steps of: determining the length of one of the at least one new first element according to length information included in the update file; and allocating memory of the Java Card device to the new first element according to the determined length.

In an example of the embodiment, before the allocating step, the method further includes: defragmenting memory of the Java Card device.

In another example of the embodiment, the update file includes one or more tags associating the length information with the new first element. As such, the Java Card device may determine the length of the new first element efficiently.

According to still another embodiment in the first aspect, the new first element is a new method_info item or a new method_component_block item. After the allocating step, the method further includes: upgrading at least one existing second item of the at least one existing component according to the location in the CAP file allocated to the new first element. The at least one existing second item includes an existing public_virtual_method_table, package_virtual_method_table, CONSTANT_StaticMethodref_info, or method_component_block_offsets item. In an example of the embodiment, before the upgrading step, the method further includes: determining at least one location of the at least one existing second item in the at least one existing component using second location information included in the update file.

This embodiment provides another way of updating the CAP file without affecting any instance data, which further reduces the size of the update file.

In another example of the embodiment, the update file includes one or more tags associating the second location information with the new first element. As such, the Java Card device may link the at least one existing second item to the new first element efficiently.

According to still another embodiment in the first aspect, the update file includes an indicator indicating whether the CAP file to be updated is in compact or extended format.

According to still another embodiment in the first aspect, one of the one or multiple first commands further includes: a parameter indicating whether the first command includes the last portion of the update file; or, a sequential number of the update file's portion which is included in the first command.

As such, the Java Card device is able to decide whether the complete update file is received.

In order to ensure atomicity, according to still another embodiment in the first aspect, for each of the at least one existing first element, before replacing the existing first element at the replacing step, the method further includes: backing up the existing first element. If an error occurs during the replacing step, then the method further includes: rolling the at least one existing component back to a version prior to the error using at least one copy of the at least one existing first element.

In a second aspect, an embodiment of the present disclosure provides a method implemented by a terminal for updating a CAP file including at least one existing component on a Java Card device. The method includes: transmitting to the Java Card device one or multiple first commands, where the first command includes an update file for updating the CAP file, or the multiple first commands each include a portion of the update file. The update file includes at least one new first element for replacing at least one existing first element of the CAP file, and includes type information or first location information for determining at least one element type or location of the at least one existing first element. The one or multiple first commands are of an instruction type of instructing the Java Card device to implement the replacing step. Each of the at least one element type represents one or more of: at least one component and at least one item of at least one component. The element type of each of the at least one new first element and the element type of the existing first element to be replaced by the new first element are the same.

According to another embodiment in the second aspect, before transmitting the one or multiple first commands, the method further includes: transmitting to the Java Card device a second command including an identifier to inform the Java Card device that the CAP file on the Java Card device is to be updated; and receiving from the Java Card device a response indicating that the Java Card device is ready to process a command subsequent to the second command if a package or CAP file associated with the identifier is found on the Java Card device. The CAP file to be updated is the CAP file associated with the identifier, or the CAP file to be updated includes the package associated with the identifier.

As such, the Java Card device may identify the CAP file to be updated amid multiple CAP files on it in an easy way and the terminal may only transmit the one or multiple first commands to the Java Card device when the CAP file is found on the Java Card device.

In a third aspect, an embodiment of the present disclosure provides a Java Card device, including a processor, a transceiver, and a memory storing one or more computer-readable instructions. When executing the instruction(s), the processor is configured to: control the transceiver to receive from the terminal one or multiple first commands including an update file for updating a CAP file including at least one existing component on the Java Card device; determine at least one element type of or at least one location of at least one existing first element of the CAP file using type information or first location information included in the update file; search the CAP file on the Java Card device for the at least one existing first element using the at least one determined element type or location; and replace each of the at least one existing first element by one of at least one new first element included in the update file if the at least one existing first element is found. The first command received from the terminal includes the update file, or the multiple first commands each include a portion of the update file. Each of the at least one element type represents one or more of: at least one component and at least one item of at least one component. The element type of each of the at least one new first element and the element type of the existing first element replaced by the new first element are the same, and the one or multiple first commands are of the same instruction type of instructing the Java Card device to perform the replacing.

In a fourth aspect, an embodiment of the present disclosure provides a terminal for updating a CAP file including at least one existing component on a Java Card device. The terminal includes a processor, a transceiver, and a memory storing one or more computer-readable instructions. When executing the instruction(s), the processor is configured to: control the transceiver to transmit to the Java Card device one or multiple first commands. The first command includes an update file for updating the CAP file, or, the multiple first commands each include a portion of the update file. The update file includes at least one new first element for replacing at least one existing first element of the CAP file, and includes type information or first location information for determining at least one element type or location of the at least one existing first element. The one or multiple first commands are of an instruction type of instructing the Java Card device to implement the replacing step. Each of the at least one element type represents one or more of: at least one component and at least one item of at least one component.

The element type of each of the at least one new first element is the same as the element type of the existing first element to be replaced by the new first element.

In a fifth aspect, an embodiment of the present disclosure provides a non-transitory computer-readable storage medium, storing one or more instructions which, when executed by a processor, enable the processor to perform the method according to any one of embodiments in the first or second aspect.

BRIEF DESCRIPTION OF THE DRAWINGS

Embodiments of the disclosure and advantages thereof will be described below in detail, by way of example, with reference to the accompanying drawings on which:

FIGS. 2 to 7 are flow charts each illustrating schematically operations of the method according to different examples of the first embodiment;

FIG. 8 is a flow chart illustrating schematically a method implemented by a terminal for updating a CAP file on a Java Card device according to a second embodiment of the disclosure;

FIG. 9 is a flow chart illustrating schematically an operation of the method according to an example of the second embodiment;

FIG. 10 is a block diagram representing schematically a Java Card device according to a third embodiment of the disclosure;

In FIGS. 10 to 16, the represented blocks are purely functional entities, which do not necessarily correspond to physically separate entities. Namely, they may be developed in the form of software, hardware, or be implemented in one or several integrated circuits, including one or more processors.

For simplicity and clarity of illustration, the same reference numerals will be used throughout the figures to refer to the same or like parts, unless indicated otherwise.

DESCRIPTION OF PARTICULAR
EMBODIMENTS

The following description of the exemplary embodiments refers to the accompanying drawings. The following detailed description does not limit the disclosure. Instead, the scope of the disclosure is defined by the appended claims. In various embodiments as illustrated by the figures, methods and a terminal for updating a CAP file including at least one existing component on a Java Card device, and a Java Card device (also named Java Card technology-based device) are described.

It is to be understood that the figures and descriptions of the present disclosure have been simplified to illustrate elements that are relevant for a clear understanding of the present disclosure, while eliminating, for the purpose of clarity, many other elements found in typical Java Card devices and in methods and terminals for updating a CAP file on Java Card devices.

The flowcharts and/or block diagrams in the figures illustrate the configuration, operations (or called "steps") and functionality of possible implementations of devices, methods and computer program products according to various embodiments of the present disclosure. In this regard, each block in the flowcharts or block diagrams may represent a module, segment, or portion of code, which includes one or more executable instructions for implementing the specified logical function(s).

Unless otherwise stated, the terms "may", "an implementation of an embodiment", "example", etc. used hereinafter each indicate feature(s) which may be included in an embodiment of the disclosure with other feature(s) described by other particular example(s)/implementation(s) of the embodiment. While not explicitly described, the embodiments/examples/implementations herein may be employed in any combination.

Figure 1:
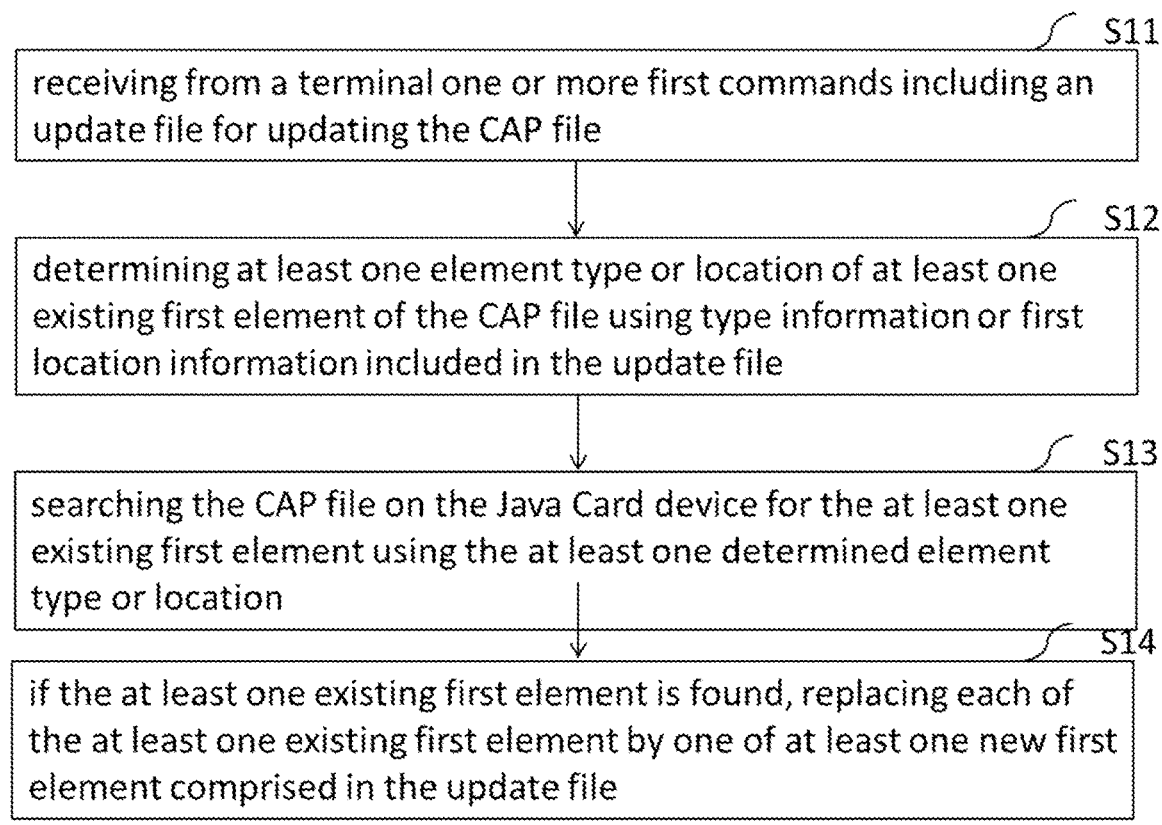
FIG. 1 is a flow chart illustrating schematically a method implemented by a Java Card device for updating a CAP file on the Java Card device according to a first embodiment of the disclosure.

As illustrated by FIG. 1, a method for updating a Java Card CAP file (hereinafter "CAP file") on a Java Card device according to a first embodiment of the disclosure includes the following steps S11-S14. The method is implemented by the Java Card device.

The Java Card device may be a smart card, a smart button, a USB token, a secure element, an embedded secure element, a universal integrated circuit card (hereinafter "UICC"), an embedded UICC (hereinafter "eUICC"), an integrated subscriber identity module (hereinafter "iSIM"), or an integrated UICC (hereinafter "iUICC"), etc.

The CAP file to be updated includes at least one existing component on the Java Card device and may include one or more classes already instantiated, not instantiated, or being instantiated on the Java Card device. In particular, the CAP file may be a so-called applet CAP file as defined in the JCVMS.

At the step S11, the Java Card device receives one or multiple first commands from a terminal. The one or multiple first commands include an update file for updating the CAP file.

The terminal refers to any apparatus capable of exchanging information with the Java Card device. It may be a device having a contact or contactless card acceptance device or APDU entity connected to it or integrated in it. For instance, a desktop computer with a card reader peripheral, or alternatively, an APDU-enabled mobile terminal.

The update file may be divided into smaller portions for transmission and each of the multiple first commands received at the step S11 carries one of the portions. Or, the complete update file may be contained within a single first command received at the step S11. In addition, the update file may be contained in the data field(s) of the one or multiple first commands.

The update file includes type information or first location information. At the step S12, the Java Card device determines at least one element type of or at least one location of at least one existing first element included in the CAP file using the type information or the first location information.

Each element type represents one or more of: at least one component and at least one item of at least one component. For example, the element type of an existing first element is the Constant Pool Component, a method_info item, or alternatively a combination of a certain component and an item of another component. The contents of a structure constituting part of a component are herein referred to as an item.

At the step S13, the Java Card device searches the CAP file on the Java Card device for the at least one existing first element using the at least one determined element type or the at least one determined location.

As such, the at least one existing first element is resident on the Java Card device. Depending on the implementation of the Java Card platform, the at least one existing first element may be the at least one existing component, part of the at least one existing component, or alternatively, outside the at least one existing component.

The update file further includes at least one new first element. If the at least one existing first element is found, then at the step S14, the Java Card device replaces each of the at least one existing first element by one of the at least one new first element. The element type of each of the at least one new first element and the element type of the existing first element replaced by the new first element are the same.

The one or multiple first commands are of an instruction type of instructing the Java Card device to implement the replacing step S14. Since the term "existing" and the condition "if the at least one existing first element is found" as mentioned at the step S14 above suggest that the at least one first element is still present on the Java Card device when the Java Card device starts to implement the replacing step S14, the replacing step S14 shall be understood as including sub-steps of removing the at least one existing first element from the CAP file and adding the at least one new first element into the CAP file to substitute for the at least one existing first element. As such, a command instructing the Java Card device simply to perform a delete operation or alternatively only to perform a load or install operation shall not be considered as a first command.

The Java Card device may determine the instruction type of a first command via any information contained in the first command. In an example of each first command being an ADPU command, the Java Card device may determine the instruction type of a first command via the instruction byte (INS) of the first command.

If multiple first commands are received from the terminal at the step S11, the Java Card device may implement the replacing step S14 each time when it receives from the terminal one first command. Or alternatively, it may implement the replacing step S14 after the complete update file is received, to avoid corrupting the CAP file or affecting normal function of e.g., any object or CAP file depending on the CAP file, in case of failing to receive any portion of the update file which should have been received.

A specific example of the first embodiment is as follows: the Java Card device receives from the terminal a first command containing an update file, it determines that the element type of an existing first element to be upgraded is method_info item according to type information in the update file, determines the location of the existing method_info item in the existing Method Component on the Java Card device according to first location information in the update file, then searches for the existing method_info item based on the determined location, and replaces the existing method_info item by a new method_info item in the update file.

By receiving one or multiple first commands and then replacing at least one card-resident element which needs to be upgraded with at least one new element included in the one or multiple first commands, the method according to the embodiment in the first aspect updates the CAP file on the Java Card device by receiving fewer components or items from the terminal without deleting any instance data of the CAP file. Accordingly, the upgrade process becomes faster comparing with the existing technology and it saves the service providers repeating the personalization process.

Various implementations of the first embodiment are detailed below.

According to an implementation, each first command is a command APDU. The structure of each APDU herein is as defined by the International Organization for Standardization (hereinafter "ISO")/International Electrotechnical Commission (hereinafter "IEC") 7816-4 or the GlobalPlatform Specification GPC_SPE_034, according to which every command APDU includes a body including a data field and a header of 4 bytes: the class byte CLA, the instruction byte INS, and the parameter bytes P1-P2.

Each first command may be referred to as an "UPDATE" command to specify its specific role. The first command may be identified by the Java Card device via its contents, such as one or more of: the INS byte, the reference control parameters P1 and P2, the data field, the length of the data field, etc.

According to an implementation, if one of the at least one existing first element is not found at the searching step (S13), then the Java Card device transmits an error message to the terminal to inform the terminal of the problem.

Figure 2:
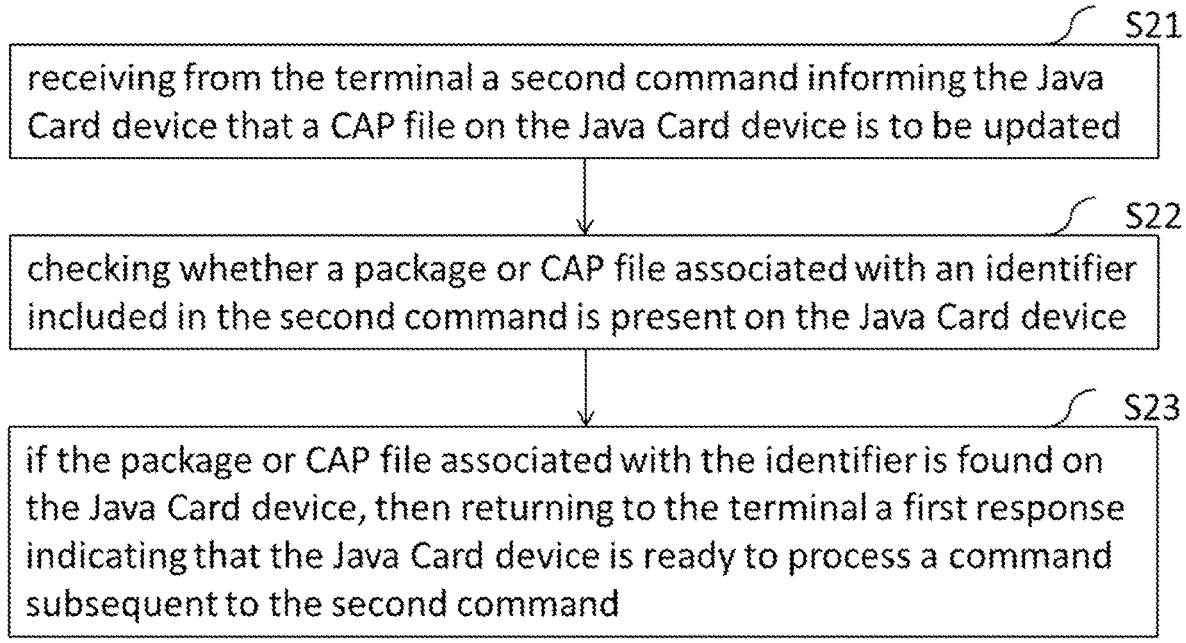

Usually there are multiple CAP files installed on a Java Card device and the Java Card device needs to know which CAP is to be updated. Thus an identifier identifying the CAP file to be updated or identifying a package included in the CAP file may be contained in the update file. An alternative solution is as illustrated by FIG. 2, where the identifier is included in a second command informing the Java Card device that a CAP file on it is to be updated. Before the step S11, the method further includes the following steps S21-S23.

At the step S21, the Java Card device receives from the terminal the second command. At the step S22, the Java Card device checks whether the package or CAP file associated with or identified by the identifier is present on it.

If the Java Card device finds that the package or the CAP file is present on it, it performs the step S23 of returning to the terminal a first response indicating that it is ready to process a command subsequent to the second command, and then it may perform the above-mentioned step S11. The first response may be a response APDU.

As mentioned in the background section herein, one or more components of a CAP file may no longer exist on the Java Card device after installation of the CAP file. Hence as an example, the checking step S22 may be implemented by using the identifier to search for a card-resident component of the CAP file associated with the identifier or containing the package associated with the identifier, or for any other card-resident information indicating the presence of one or more components of the CAP file on the Java Card device. If such a component or information is found, the Java Card device considers that the package or the CAP file associated with the identifier is found and performs the steps S23 and S11-S14.

For example, the Java Card device may include an internal table indicating all the packages or CAP files on it and the identifiers associated with them. Or, the Java Card device may check package identifier(s) in the Header Component of each CAP file on it.

In an example, if the Java Card device does not find that the package or CAP file associated with the identifier is present on it as a result of the checking step S22, then it transmits to the terminal a second response indicating an error status. The second response may be a response APDU.

In another example, the second command is a command APDU. The second command may be named as INSTALL [for update] to indicate its specific role, and may be identified by its contents, such as one or more of: the INS byte, the reference control parameters P1 and P2, the data field, the length of the data field, etc. The INS byte of the second command may be set to 'E6', meaning "INSTALL" according to the GlobalPlatform Specification GPC_SPE_034, or alternatively may have a different value.

The following Table 1 describes an exemplary structure of the INSTALL [for update] command data field.

TABLE 1

| INSTALL[for update] Command Data Field | | | |
| --- | --- | --- | --- |
| Name | Length | Value | Presence |
| Length of Load File AID | 1 | '05'-'10' | Mandatory |
| Load File AID | 5-16 | 'xxxx . . . ' | Mandatory |

The Load File AID in Table 1 may refer to the identifier in the second command.

The identifier may be an application identifier (hereinafter "AID") as defined in the ISO/IEC 7816-5 or the JCVMS (e.g., v3.1 or v2.2.2). As shown in table 1 above, it may be contained in the data field of the second command.

According to v3.1 of the JCVMS, CAP files and packages are identified using AIDs, whereas according a JCVMS version prior to v3.1 such as v2.2.2, AIDs are assigned to packages, not CAP files. Accordingly, the identifier in the second command may be an AID associated with or assigned to a package (for example, in the Java Card platform as specified by v3.1 or v2.2.2 of the JCVMS), or may be an AID associated with or assigned to a CAP file (for example, in a Java Card platform as specified by v3.1 of the JCVMS), depending on the version of the Java Card platform where the method according to the first embodiment is implemented.

According to an implementation, the type information indicates at least one element type of the at least one new first element. Since the element type of any existing first element is the same as that of the new first element to replace it at the replacing step S14, such type information enables the Java Card device to determine the at least one element type of at least one existing first element efficiently.

Or, the type information indicates at least one element type of at least one existing second element each including one existing first element. An existing second element, just as an existing first element, may include one or more of: at least one existing component of the CAP file and at least one existing item of at least one existing component of the CAP file. Such type information may reduce the size of the update file in cases where, e.g., the Java Card device is able to determine the element types or locations of multiple existing first elements using a piece of the type information indicating the element type of an existing second element including the multiple existing first elements.

For example, the type information includes the location of a new first element in the update file. For example, the location indicates the element type of the new first element. Or, the type information includes one or more tags each associated with the element type of: a new first element, or an existing second element including the existing first element to be replaced by the new first element at the step S14. Accordingly, the Java Card device may be configured as such that it is able to determine the element type using the one or more tags or according to the location in the update file.

In particular, the one or more tags and the new first element may be grouped together in the update file, so as to help the Java Card device to determine the existing first element to be replaced by the new first element efficiently. For example, the tag and the new first element are contained in the tag field and the value field of a tag-length-value (hereinafter "TLV") structure in the update file, respectively. Or, the update file includes multiple TLV structures, where one or more TLVs are nested into the value field of another TLV, the multiple tags are in the tag fields of the multiple TLVs, and the new first element is contained in the value field of the first or an innermost nested TLV.

According to an implementation, the first location information indicates the location(s) of one or more existing first elements, so that the Java Card device may locate one or more existing first elements efficiently. Or, the first location information indicates the location(s) of one or more existing second elements, so as to reduce the size of the update file, or to complement the information indicating the location(s) of the existing first element(s). Each of the location(s) refers to a location in the CAP file.

For example, the first location information may include an offset or index of: an existing first element in an existing second element, or the existing second element in an existing third element. The existing third element, just as the existing first element or the existing second element, may include one or more of: at least one existing component of the CAP file and at least one existing item of at least one existing component of the CAP file.

In particular, the update file may include one or more tags associating the offset or index with the new first element to replace the existing first element, so that the Java Card device may link the existing first element to the new first element efficiently. For example, the offset or index and the new first element may be contained in the value field of a same tag in a TLV structure. In particular, the offset or index and the new first element may be contained in the value fields of different sub-tags of TLVs nested into the value field of the tag.

According to an implementation, the update file includes an indicator indicating whether the CAP file to be updated is in compact or extended format, so as to guarantee the compatibility of the update file with different formats of CAP file. In addition, the indicator may be included in the type information or first location information so as to avoid increasing the size of the update file.

For example, the first location information includes a location value indicating the location of a method_component_block. When the CAP file is in compact format, the location value equals 0, whereas when the CAP file is in extended format, the location value is greater than 0.

According to an implementation as illustrated by FIG. 3, the update file includes length information and the method further includes the steps S31-S32.

At the step S31, the Java Card device determines the length of a new first element according to the length information.

At the step S32, the Java Card device allocates its memory to the new first element according to the determined length.

The memory may be any memory allowing a CAP file stored on it to be upgraded. For example, it may be one or more of: a random access memory (hereinafter "RAM"), a non-volatile memory such as an electrically erasable, programmable read only memory (hereinafter "EEPROM") and flash.

As such, the Java Card device determines the memory to be allocated to the new first element efficiently.

In an example of the implementation as illustrated by FIG. 4, before the allocating step S32, the method further includes a step S41 of defragmenting its memory.

In another example of the implementation, the update file includes one or more tags associating the length information with the new first element. As such, the Java Card device may link the length information to the new first element and then determine the length of the new first element accordingly. For example, the length information and the new first element may be contained in the length field and the value field of a same tag in a TLV structure, respectively. Or alternatively, the length information may be derivable from the length field of the TLV whose value field containing the new first element. Or alternatively, the length information and the new first element may be contained in the value field of a same tag in a TLV structure, or may be contained in the value fields of different sub-tags of TLVs nested into the value field of the tag.

According to an implementation, the at least one new first element includes at least one new bytecodes item to be added into the CAP file through the replacing step S14, or the at least one existing first element includes at least one existing bytecodes item to be removed from the CAP file through the replacing step S14. Herein the term "a first element includes at least one item" means that the at least one item is part of the first element, or the first element includes/equals the at least one item. For example, the at least one new bytecodes item may be a new bytecodes item, or a method_info item including the new bytecodes item, etc.

Since only bytecodes that implement at least one method are added into or removed from the CAP file, any object created from a class of the CAP file before the replacing step S14 may still match the class after the replacing step S14, thus avoid deleting any instance data of the object for updating the CAP file.

Adding the at least one new bytecodes item into, or, removing the at least one existing bytecodes item from the CAP file may affect at least one existing first item of the at least one existing component on the Java Card device. Accordingly, to avoid affecting any existing object of any class of the CAP file, the at least one existing first item shall be upgraded. For example, after an existing bytecodes item is replaced by a new bytecodes item at the replacing step S14, the parameter list/types of a method implemented by the existing bytecodes item may need to be updated to match the new bytecodes item. Accordingly, any other existing method_info item of the CAP file that invokes the new method_info item needs to be upgraded to match the updated parameter list.

Examples of the at least one affected existing first item, apart from the method_header item as suggested above, include an existing handler_count or count item, an existing size item in an existing Method Component, Class Component or Constant Pool Component, or, an existing exception_handlers, public_virtual_method_table, package_virtual_method_table, constant_pool, CONSTANT_StaticMethodref_info, or method_component_block_offsets item, etc.

The at least one existing first item may be upgraded in different ways. In an example, the at least one existing first item is upgraded through the replacing step S14. For instance, the update file, or rather the at least one new first element, includes at least one new first item to replace the at least one existing first item at the replacing step S14. As such, the Java Card device may update the CAP file easily.

In another example, to avoid increasing the size of the update file, at least one existing second item of the at least one existing first item is upgraded by the Java Card device according to at least one updated location allocated to at least one method_info or method_component_block item of the CAP file, where the at least one location is updated due to the adding or removing of the at least one bytecodes item as mentioned above. The at least one existing second item includes an existing public_virtual_method_table, package_virtual_method_table, CONSTANT_StaticMethodref_info, or method_component_block_offsets item. For example, if the new first element whose length is determined according to the length information at the step S31 is a new method_info item or a new method_component_block item, then after the allocating step S32, as illustrated by FIG. 5, the method further includes a step S51 of upgrading the at least one existing second item according to the location in the CAP file allocated to the new first element.

As illustrated by FIG. 6, before the step S51, the method may further include a step S61 of determining the location(s) of one or more existing second items in the at least one existing component using second location information in the update file. For detail and examples of the second location information, please refer to those of the first location information described above.

In particular, the update file includes one or more tags associating the second location information with the new first element, so that the Java Card device links the second location information to the new first element. For example, the second location information and the new first element may be contained in the value field of a same tag in a TLV structure, or in the value fields of different sub-tags of TLVs nested into the value field of the tag.

According to an implementation, one or each first command further includes: a parameter indicating whether the first command includes the last portion of the update file, or, a sequential number of the update file's portion that is included in the first command. Examples where each first command is a command APDU are given below.

In a first example, each of multiple first commands received at the step S11 is numbered from '00' to 'FF' via the reference control parameter P2. That is, P2 contains the portion number. The numbering is strictly sequential and increments by one.

In a second example described by Table 2 below, the bit b8 of the reference control parameter P1 of each first command (named "UPDATE") indicates whether the first command contains the last block of a sequence of blocks of the update file.

TABLE 2

| UPDATE Command Reference Control Parameter P1 | | | | | | | |
|---|---|---|---|---|---|---|---|
| b8 | b7 | b6 | b5 | b4 | b3 | b2 | b1 | Meaning |
| 0 | | | | | | | | More blocks |
| 1 | | | | | | | | Last block |
| | x | X | x | x | X | x | x | Reserved for Future Use |

As such, the Java Card device may determine whether it has received the complete update file or not.

To guarantee that the update to the CAP file is atomic, as illustrated by FIG. 7, for each existing first element, before replacing it at the step S14, the method may further include a step S71 of backing up the existing first element. If an error (such as power loss or card removal) occurs during the replacing step S14, then the method may further include a step S72 of rolling the at least one existing component back to a version prior to the error using at least one copy of the at least one existing first element.

Accordingly, if the Java Card device loses power during the update of an existing first element, the existing first element shall be restored to its previous value.

Below are specific examples of the method according to the first embodiment.

An exemplary update file is structured as table 3A below. This example may be applied to a CAP file format as specified in the JCVMS v2.2.2.

TABLE 3A

| Update File Structure Example I | | | |
|---|---|---|---|
| Tag | Length | Name | Presence |
| 'E1' | 1 – n | Method Component Info | Mandatory |
| '70' | 1 | New handler_count | Mandatory |
| '71' | 1 – n | New exception_handlers | Mandatory |
| 'E2' | 1 – n | Method Info | Mandatory |
| '80' | 2 | Offset of a class_info to be updated in the info item of the Class Component | Mandatory |
| '81' | 2 | Offset of a method_info to be updated in the info item of the Method Component | Mandatory |
| '83' | 2 | Length of a new method_info | Mandatory |
| '84' | 1 – n | The new method_info | Mandatory |
| . | . | . | . |
| . | . | . | . |
| . | . | . | . |
| 'E2' | 1 – n | Method Info | Conditional |
| '80' | 2 | Offset of a class_info to be updated in the info item of the Class Component | Mandatory |
| '81' | 2 | Offset of a method_info to be updated in the info item of the Method Component | Mandatory |

TABLE 3A-continued

| Update File Structure Example I | | | |
|---|---|---|---|
| Tag | Length | Name | Presence |
| '83' | 2 | Length of a new method_info | Mandatory |
| '84' | 1 – n | The new method_info | Mandatory |

In the example as shown by Table 3A above, after having received the last block/portion of the update file, the Java Card device executes the following internal process necessary for updating the CAP file:
1. a) based on the tag 'E1' and the tags '70' and '71' nested into the value field of 'E1', the Java Card device finds the existing exception_handlers and handler_count items of the existing Method Component of the CAP file associated with an AID or including the package associated with the AID included in a previous INSTALL [for update] command;
   b) the Java Card device replaces the existing handler_count and exception_handlers items by the new first elements contained in the values fields of the tags '70' and '71', respectively;
2. the value field of each tag 'E2' includes the tags '80', '81', '83' and '84', and according to the TLV of each tag 'E2', the Java Card device performs the following operations:
   a) finding the existing method_info item to be updated in the existing Method Component using the first location information in the value field of the tag '81';
   b) defragmenting memory and then allocating memory to the new method_info item to replace the existing method_info item based on the length information contained within value field of the tag '83';
   c) replacing the existing method_info item by the new method_info item contained within the value field of the tag '84';
   d) finding the existing class_info item to be updated in the existing Class Component of the CAP file using the second location information contained in the value field of the tag '80';
   e) upgrading the existing public_virtual_method_table and package_virtual_method_table items in the existing class_info item, based on the location allocated to the new method_info item at the operation 2b;
   f) upgrading an existing CONSTANT_StaticMethodref item representing the existing method_info item in the existing Constant Pool Component of the CAP file, based on the location allocated to the new method_info item at the operation 2b.

Another exemplary update file is structured as table 3B below. This example may be applied to a compact or extended CAP file format as specified in the JCVMS v3.1.

TABLE 3B

| Update File Structure Example II | | | |
|---|---|---|---|
| Tag | Length | Name | Presence |
| '07' | | Method Component Info 1 | Mandatory |
| | 2 | Index of method_component_block to be updated in the method_component_block blocks array (0 for compact mode) | Conditional |
| | 1 | New handler_count | Conditional |
| | 1 – n | New exception_handlers | Conditional |
| '00' | | Method info 1 | Mandatory |
| | 2 | Index of a method_info to be updated in the methods array or in the method_component_block | Conditional |
| | 1 – n | The new method_info | Conditional |
| . | | | |
| . | | | |

TABLE 3B-continued

Update File Structure Example II

| Tag | Length | Name | Presence |
|-----|--------|------|----------|
| . | | | . |
| '00' | | Method info n | Optional |
| . | | | . |
| . | | | |
| '07' | | Method Component Info n | Optional |
| . | | | . |
| . | | | |
| '05' | | Constant Pool Component Info | Mandatory |
| | 2 | New count | Conditional |
| | 1 – n | New constant_pool | Conditional |
| '06' | | Class Component Info 1 | Mandatory |
| | 2 | Index of a class_info to be updated in the classes array of the Class Component | Conditional |
| | 1 – n | New class_info | Conditional |
| . | . | . | . |
| . | . | . | . |
| '06' | | Class Component Info n | Optional |

In the example shown by Table 3B above, after having received the last block of the update file, the Java Card device executes the following internal process necessary for updating the CAP file:
1. for each Method Component Info (tag '07') in the update file, the Java Card device updates the existing handler_count and exception_handlers items in an existing compact Method Component (which has only one existing handler_count items and only one existing exception_handlers item) when the index equals 0, or in the method_component_block at the index of the method_component_block in an existing extended Method Component when the index is greater than 0;
2. for each Method Info (tag '00' contained within the value field of the tag '07') in the update file, the Java Card device allocates memory to the new method_info according to its length which equals the value of the length field of the tag '00' minus 2, and replaces an existing method_info at the location indicated by the index of the method_info, or by the index of the method_info and the index of the method_component_block, with the new method_info item;
3. based on the Constant Pool Component Info (tag '05') in the update file, the Java Card device replaces the existing count and constant_pool items with the new count and constant_pool items;
4. for each Class Component Info (tag '06') in the update file, the Java Card device replaces the existing class_info at the index of the existing class_info with the new class_info item.

As illustrated by FIG. 8, another method for updating a CAP file on a Java Card device according to a second embodiment of the disclosure includes the following step S81. The method is implemented by the terminal.

At the step S81, the terminal transmits to the Java Card device one or multiple first commands. If the terminal transmits only one first command to the Java Card device at the step S81, then the first command includes an update file for updating the CAP file, otherwise the multiple first commands each include a portion of the update file. The update file includes at least one new first element for replacing at least one existing first element of the CAP file, and includes type information or first location information for determining at least one element type of or at least one location of the at least one existing first element.

The one or multiple first commands are of the same instruction type of instructing the Java Card device to implement the replacing step. Each of the at least one element type represents one or more of: at least one component and at least one item of at least one component. The element type of each of the at least one new first element and the element type of the existing first element to be replaced by the new first element are the same.

The term "existing" denotes that the one or multiple first commands is intended for instructing the Java Card device to upgrade (i.e., replace with the at least one new first element) at least one first element which is still present within the CAP file when the replacing step starts.

By sending one or multiple first commands to the Java Card device to replace at least one card-resident element which needs to be upgraded with at least one new element included in the one or multiple first commands, the method according to the second embodiment updates the CAP file on the Java Card device by transmitting fewer components or items to the Java Card device without deleting any instance data of the CAP file. Accordingly, the upgrade process becomes faster comparing with the existing technology and it saves the service providers repeating the personalization process.

If one of the at least one existing first element is not found by the Java Card device according to the type information or first location information, the terminal may receive an error message from the Java Card device.

As illustrated by FIG. 9, according to an implementation of the second embodiment, before the step S81, the method further includes the steps S91 and S92.

At the step S91, the terminal transmits to the Java Card device a second command including an identifier to inform it that a CAP file on it is to be updated.

If a package or CAP file associated with the identifier is found on the Java Card device, then at the step S92, the terminal receives from the Java Card device a first response indicating that the Java Card device is ready to process a command subsequent to the second command. The CAP file to be updated is the CAP file associated with the identifier, or includes the package associated with the identifier.

In an example, the previous step S81 is implemented if the first response is received by the terminal. In another example, the terminal may receive from the Java Card device a second response indicating an error status if no package or CAP file associated with the identifier is found on the Java Card device.

For details and examples of the first command(s) and the second command, please refer to the various implementations of the first embodiment.

As illustrated by FIG. 10, a Java Card device 100 according to a third embodiment of the disclosure includes a receive module 101, a determine module 102, a search module 103 and a replace module 104.

The receive module 101 is configured to receive from a terminal one or multiple first commands. The first command includes an update file for updating a CAP file, or the multiple first commands each include a portion of the update file. The CAP file includes at least one existing component on the Java Card device 100.

The update file includes type information or first location information. The determine module 102 is configured to use the type information or first location information to determine: at least one element type of at least one existing first element of the CAP file, or at least one location of the at least one existing first element. Each of the at least one element type represents one or more of: at least one component and at least one item of at least one component.

The search module 103 is configured to search the CAP file on the Java Card device 100 for the at least one existing first element using the at least one determined element type or location.

The update file further includes at least one new first element. The replace module 104 is configured to replace each of the at least one existing first element by one of the at least one new first element if the at least one existing first element is found. The element type of each of the at least one new first element and the element type of the existing first element replaced by the new first element are the same. The one or multiple first commands are of an instruction type of instructing the Java Card device 100 to implement the replacing step.

The Java Card device 100 is configured to implement the method according to the first embodiment. The various implementations of the first embodiment may apply in an analogous manner to the Java Card device 100. Some implementations of the third embodiment are described below.

Figure 11:
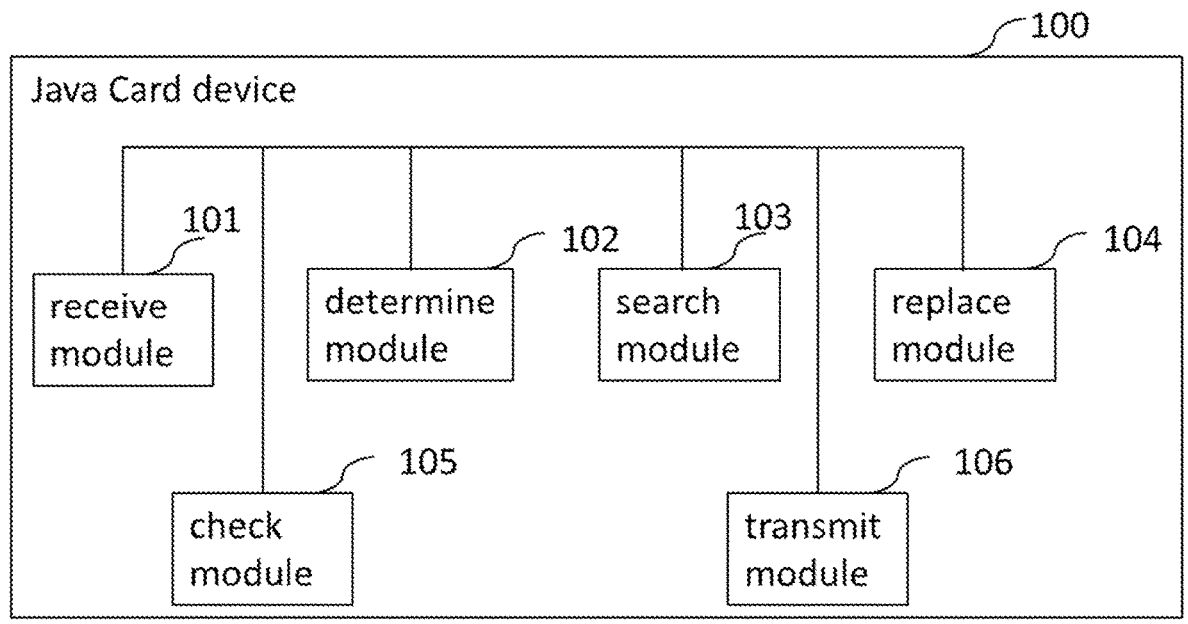
FIGS. 11 to 14 are block diagrams representing schematically the Java Card device according to different examples of the third embodiment.

As illustrated by FIG. 11, according to an implementation, the Java Card device 100 further includes a check module 105 and a transmit module 106. Before receiving the one or multiple first commands, the receive module 101 is further configured to receive a second command informing the Java Card device 100 that a CAP file on the Java Card device 100 is to be updated. The second command includes an identifier. The check module 105 is configured to check whether a package or CAP file associated with the identifier is present on the Java Card device 100. The CAP file to be updated is the CAP file associated with the identifier, or includes the package associated with the identifier. If the check module 105 finds the package or CAP file associated with the identifier on the Java Card device 100, then the transmit module 106 is configured to return to the terminal a response indicating that the Java Card device 100 is ready to process a command subsequent to the second command. In an example, the receive module 101 is configured to receive the one or multiple first commands if the check module 105 finds the package or CAP file associated with the identifier on the Java Card device 100.

According to an implementation, the replace module 104 is configured to replace each of the at least one existing first element by one of the at least one new first element after the complete update file is received by the receive module 101.

According to an implementation, the replace module 104 is further configured to: add at least one new bytecodes item into, or remove at least one existing bytecodes item from the CAP file through the replacement of the at least one existing first element by the at least one new first element. The replace module 104 may be further configured to upgrade at least one existing first item affected by the adding or removing through the replacement. The at least one affected existing first item is as defined in the first embodiment.

Figure 12:
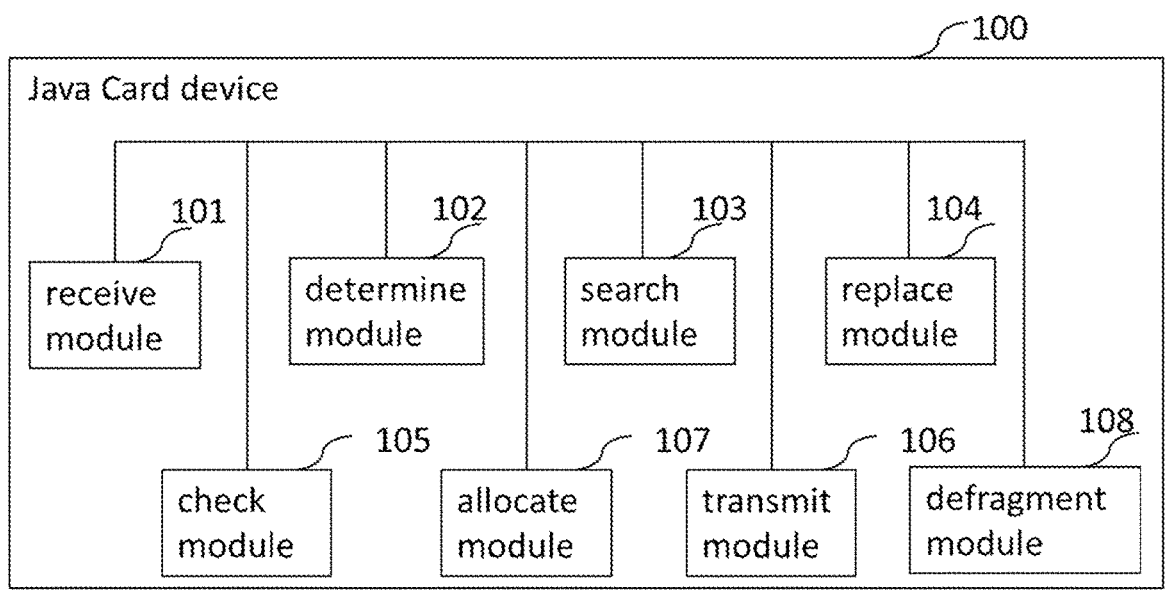

As illustrated by FIG. 12, according to an implementation, the Java Card device 100 further includes an allocate module 107. The update file further includes length information. The determine module 102 is further configured to determine the length of a new first element according to the length information. The allocate module 107 is configured to allocate memory of the Java Card device 100 to the new first element according to the determined length. In an example of the implementation, as illustrated by FIG. 12, the Java Card device 100 further includes a defragment module 108, which is configured to defragment memory of the Java Card device 100 before the allocate module 107 allocates memory to the new first element according to the determined length.

Figure 13:
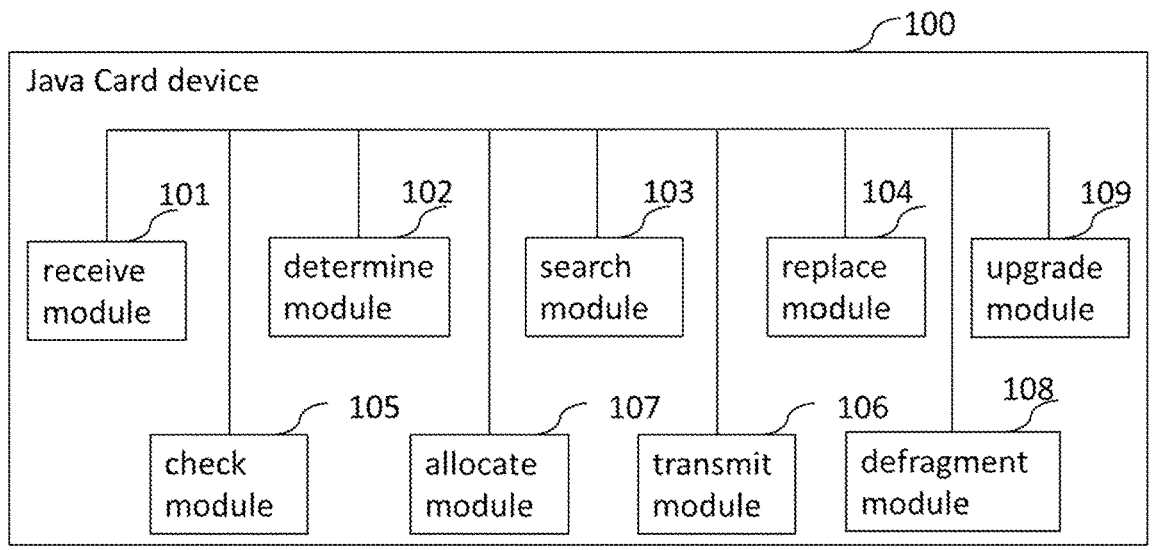

As illustrated by FIG. 13, according to an implementation, the new first element is a new method_info item or a new method_component_block item. The Java Card device 100 further includes an upgrade module 109, which is configured to upgrade, after the allocate module 107 allocates memory to the new first element, at least one existing second item of the at least one existing component according to a location in the CAP file allocated to the new first element. The at least one existing second item is as defined in the first embodiment. In an example, the update file includes second location information and the determine module 102 is further configured to determine at least one location of the at least one existing second item in the at least one existing component using the second location information.

Figure 14:
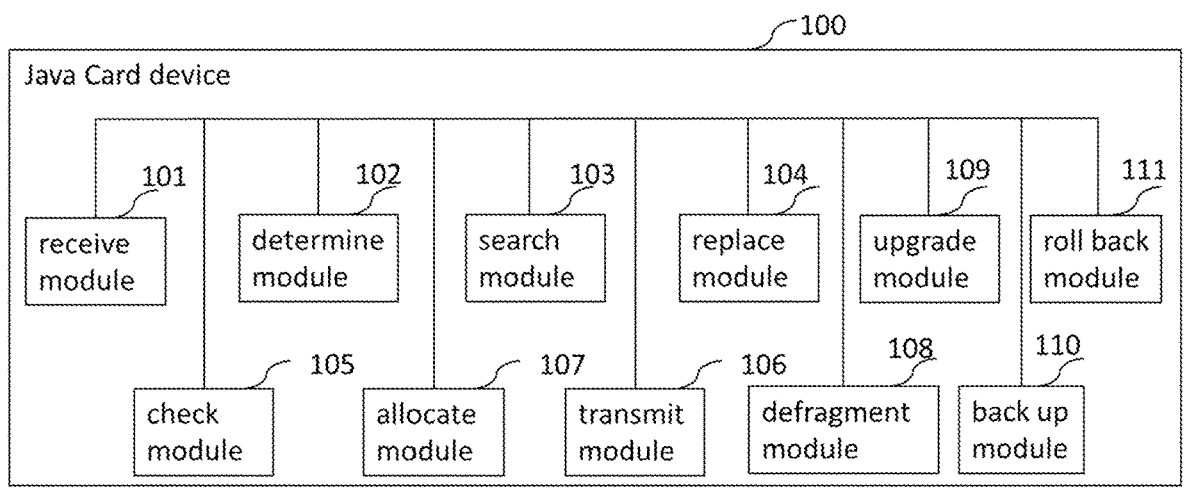

As illustrated by FIG. 14, according to an implementation of the third embodiment, the Java Card device 100 further includes a back up module 110 and a roll back module 111. For each existing first element, the back up module 110 is configured to back up (that is, make a spare copy of) the existing first element before the replace module 104 replaces it with a new first element. If an error occurs when the replace module 110 replaces an existing first element by a new first element, the roll back module 111 is configured to roll the at least one existing component back to a version prior to the error using at least one copy of the at least one existing first element.

Figure 15:
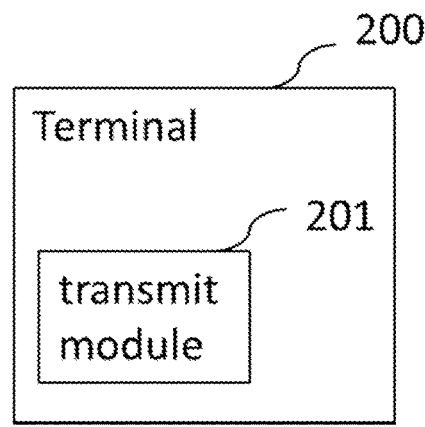
FIG. 15 is a block diagram representing schematically a terminal for updating a CAP file on a Java Card device according to a fourth embodiment of the disclosure.

As illustrated by FIG. 15, according to a fourth embodiment of the disclosure, a terminal 200 for updating a CAP file including at least one existing component on a Java Card device includes a transmit module 201, which is configured to transmit to the Java Card device one or multiple first commands. The first command includes an update file for updating the CAP file, or the multiple first commands each include a portion of the update file. The update file includes at least one new first element for replacing at least one existing first element of the CAP file, and includes type information or first location information for determining at least one element type or location of the at least one existing first element. The one or multiple first commands are of an instruction type of instructing the Java Card device to implement the replacing step. The element type of each of the at least one new first element is the same as the element type of the existing first element to be replaced by the new first element. Each of the at least one element type represents one or more of: at least one component and at least one item of at least one component.

The terminal 200 is configured to implement the method according to the second embodiment. The various implementations of the second embodiment may apply in an analogous manner to the terminal 200.

Figure 16:
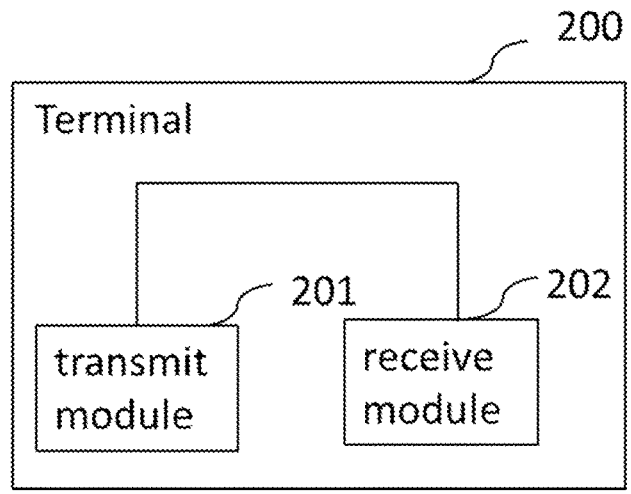
FIG. 16 is a block diagram representing schematically the terminal according to an example of the fourth embodiment.

As illustrated by FIG. 16, according to an implementation of the fourth embodiment, the terminal 200 further includes a receive module 202. Before transmitting the one or multiple first commands to the Java Card device, the transmit module 201 is further configured to transmit to the Java Card device a second command including an identifier to inform the Java Card device that a CAP file on the Java Card device is to be updated. If a package or CAP file associated with the identifier is found on the Java Card device, the receive module 202 is configured to receive from the Java Card device a response indicating that the Java Card device is ready to process a command subsequent to the second command. The CAP file to be updated is the CAP file associated with the identifier, or includes the package associated with the identifier. In an example, the transmit module 102 is configured to transmit the one or multiple first commands to the Java Card device under the condition that the response is received by the receive module 202.

The disclosure may be implemented using software and/or hardware components. In this context, the term "module" herein can refer to a software component, as well as a hardware component or a plurality of software and/or hardware components.

According to an implementation of the third or fourth embodiment, operation of various modules is controlled using specific application software.

Figure 17:
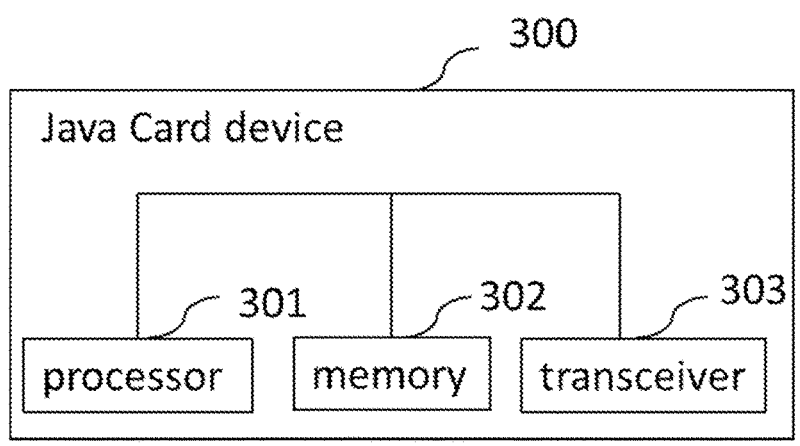
FIG. 17 is a block diagram representing schematically a Java Card device according to a fifth embodiment of the disclosure.

As illustrated by FIG. 17, a Java Card device 300 according to a fifth embodiment of the disclosure includes a processor 301, a memory 302 and a transceiver 303. The memory 302 is configured to store one or more instructions. The transceiver 303 is configured to, under the control of the processor 301, receive information from or transmit information to a terminal. The processor 301 is configured to execute the one or more instructions to implement the method for updating the CAP file on the Java Card device 300 according to any implementation of the first embodiment.

An example of the processor 301 is a central processing unit (hereinafter "CPU"). The various implementations of the first embodiment may apply in an analogous manner to the Java Card device 300.

Figure 18:
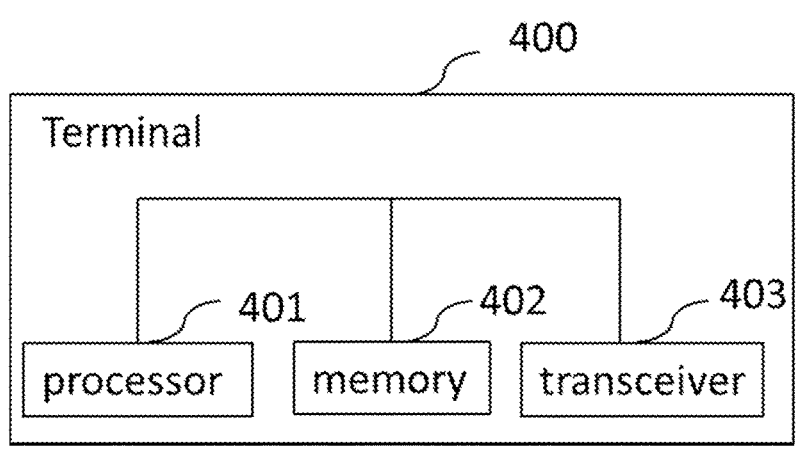
FIG. 18 is a block diagram representing schematically a terminal for updating a CAP file on a Java Card device according to a sixth embodiment of the disclosure.

As illustrated by FIG. 18, according to a sixth embodiment of the disclosure, a terminal 400 for updating a CAP file including at least one existing component on a Java Card device includes a processor 401, a memory 402 and a transceiver 403. The memory 402 is configured to store one or more instructions. The transceiver 403 is configured to, under the control of the processor 401, receive information from or transmit information to a Java Card device. The processor 401 is configured to execute the one or more instructions to implement the method for updating the CAP file on the Java Card device according to any implementation of the second embodiment.

The various implementations of the second embodiment may apply in an analogous manner to the terminal 400.

According to a seventh embodiment of the disclosure, a system includes the terminal 200 according to any implementation of the fourth embodiment, and the Java Card device 100 according to any implementation of the third embodiment. Or, the system includes the terminal 400 according to any implementation of the sixth embodiment, and the Java Card device 300 according to any implementation of the fifth embodiment.

It will also be noted that each block of the block diagrams and/or flowchart illustration can be implemented by special purpose hardware-based system(s) that performs the specified functions or acts, or combinations of special purpose hardware and computer instructions.

According to an eighth embodiment of the disclosure, a computer-readable storage medium is configured to store one or more instructions which, when executed by a processor, cause the processor to perform the method according to the first or second embodiment of the disclosure.

Any combination of one or more computer readable storage medium(s) may be utilized. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer readable storage mediums to which the present principles can be applied, is merely an illustrative and not exhaustive listing as is readily appreciated by one of ordinary skill in the art: a portable computer disc, a hard disc, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Another aspect of the disclosure pertains to a computer program product downloadable from a communication network and/or recorded on a medium readable by computer and/or executable by a processor, including program code instructions for implementing the operations of the method according to the first or second embodiment of the disclosure.

This disclosure having been described in particular embodiments, it is clear that it is susceptible to numerous modifications and embodiments within the scope of the disclosure as defined by the following claims.

What is claimed is:

1. A method implemented by a Java Card device for updating a converted applet (CAP) file comprising at least one existing component on the Java Card device, comprising steps of:
   receiving from a terminal one or multiple first commands, the first command comprising an update file for updating the CAP file, or the multiple first commands each comprising a portion of the update file;

determining at least one element type or location of at least one existing first element of the CAP file using type information or first location information comprised in the update file, each of the at least one element type representing one or more of: at least one component and at least one item of at least one component;

searching the CAP file on the Java Card device for the at least one existing first element using the at least one determined element type or location; and when the at least one existing first element is found, replacing each of the at least one existing first element by one of at least one new first element comprised in the update file, wherein an element type of each of the at least one new first element is the same as an element type of the existing first element replaced by the new first element, and the one or multiple first commands are of an instruction type of instructing the Java Card device to implement the replacing step.

2. The method according to claim 1, before receiving the one or multiple first commands, further comprising:

receiving from the terminal a second command informing the Java Card device that the CAP file on the Java Card device is to be updated;

determining that a package or CAP file associated with an identifier comprised in the second command is present on the Java Card device, the CAP file to be updated being the CAP file associated with the identifier, or comprising the package associated with the identifier; and returning to the terminal a response indicating that the Java Card device is ready to process a command subsequent to the second command.

3. The method according to claim 1, wherein the replacing step is implemented after the complete update file is received by the Java Card device.

4. The method according to claim 1, wherein the type information indicates at least one element type of the at least one new first element, or the type information indicates at least one element type of at least one existing second element each comprising one of the at least one existing first element.

5. The method according to claim 4, wherein the type information comprises:

a location of one of the at least one new first element in the update file, or one or more tags each associated with an element type of one of the at least one new first element, or associated with an element type of an existing second element comprising an existing first element to be replaced by the new first element, wherein optionally the one or more tags and the new first element are grouped together in the update file.

6. The method according to claim 1, wherein the first location information indicates at least one location of the at least one existing first element in the CAP file, or the first location information indicates at least one location of at least one existing second element each comprising one of the at least one existing first element in the CAP file.

7. The method according to claim 6, wherein the first location information comprises an offset or index of:

one of the at least one existing first element in one of the at least one existing second element, or the existing second element in an existing third element.

8. The method according to claim 7, wherein the update file comprises one or more tags associating the offset or index with the new first element to replace the existing first element.

9. The method according to claim 1, wherein the at least one new first element comprises at least one new bytecodes item to be added into the CAP file through the replacing step, or the at least one existing first element comprises at least one existing bytecodes item to be removed from the CAP file through the replacing step.

10. The method according to claim 9, wherein at least one existing first item affected by the adding or removing is upgraded through the replacing step, the at least one affected existing first item being comprised in the at least one existing component and comprising:

an existing handler_count or count item, or an existing size item in an existing Method Component, Class Component or Constant Pool Component, or an existing exception_handlers, public_virtual_method_table, package_virtual_method_table, constant_pool, or method_component_block_offsets item.

11. The method according to claim 1, further comprising steps of:

determining a length of one of the at least one new first element according to length information comprised in the update file; and allocating memory of the Java Card device to the new first element according to the determined length.

12. The method according to claim 11, wherein before the allocating step, the method further comprises defragmenting memory of the Java Card device; or wherein the update file comprises one or more tags associating the length information with the new first element.

13. The method according to claim 11, wherein the new first element is a new method_info item or a new method_component_block item, and after the allocating step, the method further comprises:

upgrading at least one existing second item of the at least one existing component according to a location in the CAP file allocated to the new first element, the at least one existing second item comprising an existing public_virtual_method_table, package_virtual_method_table, CONSTANT_StaticMethodref_info, or method_component_block_offsets item.

14. The method according to claim 13, before the upgrading step, further comprising:

determining at least one location of the at least one existing second item in the at least one existing component using second location information comprised in the update file.

15. The method according to claim 14, wherein the update file comprises one or more tags associating the second location information with the new first element.

16. The method according to claim 1, wherein the update file comprises an indicator indicating whether the CAP file to be updated is in compact or extended format; or one of the one or multiple first commands further comprises:

a parameter indicating whether the first command comprises a last portion of the update file, or, a sequential number of a portion of the update file, the portion being comprised in the first command.

17. The method according to claim 1, for each of the at least one existing first element, before replacing the existing first element at the replacing step, the method further comprising:
  backing up the existing first element; and
  when an error occurs during the replacing step, the method further comprising:
  rolling the at least one existing component back to a version prior to the error using at least one copy of the at least one existing first element.

18. A method implemented by a terminal for updating a converted applet (CAP) file comprising at least one existing component on a Java Card device, comprising:
  transmitting to the Java Card device one or multiple first commands, the first command comprising an update file for updating the CAP file, or the multiple first commands each comprising a portion of the update file, wherein the update file comprises at least one new first element for replacing at least one existing first element of the CAP file, and comprises type information or first location information for determining at least one element type or location of the at least one existing first element,
  wherein the one or multiple first commands are of an instruction type of instructing the Java Card device to implement the replacing step, an element type of each of the at least one new first element is the same as an element type of the existing first element to be replaced by the new first element and each of the at least one element type represents one or more of: at least one component and at least one item of at least one component.

19. The method according to claim 18, before transmitting the one or multiple first commands, further comprising:
  transmitting to the Java Card device a second command comprising an identifier to inform the Java Card device that the CAP file on the Java Card device is to be updated; and
  receiving from the Java Card device a response indicating that the Java Card device is ready to process a command subsequent to the second command when a package or CAP file associated with the identifier is found on the Java Card device, the CAP file to be updated being the CAP file associated with the identifier, or comprising the package associated with the identifier.

20. A Java Card device, comprising:
  a processor;
  a transceiver configured to, under control of the processor, receive information from or transmit information to a terminal; and
  a memory storing one or more instructions which, when executed by the processor, enable the processor to:
    control the transceiver to receive from the terminal one or multiple first commands, the first command comprising an update file for updating a converted applet (CAP) file comprising at least one existing component on the Java Card device, or the multiple first commands each comprising a portion of the update file;
    determine at least one element type or location of at least one existing first element of the CAP file using type information or first location information comprised in the update file, each of the at least one element type representing one or more of: at least one component and at least one item of at least one component;
    search the CAP file on the Java Card device for the at least one existing first element using the at least one determined element type or location; and
    replace each of the at least one existing first element by one of at least one new first element comprised in the update file when the at least one existing first element is found, wherein an element type of each of the at least one new first element is the same as an element type of the existing first element replaced by the new first element, and the one or multiple first commands are of an instruction type of instructing the Java Card device to implement the replacing step.

* * * * *